United States Patent
Okadome

(10) Patent No.: US 7,694,603 B2
(45) Date of Patent: Apr. 13, 2010

(54) TRANSMISSION EQUIPPED WITH CABLE-TYPE SHIFT DEVICE

(75) Inventor: Yasuki Okadome, Hiroshima (JP)

(73) Assignee: Mazda Motor Corporation (JP)

( * ) Notice: Subject to any disclaimer, the term of this patent is extended or adjusted under 35 U.S.C. 154(b) by 687 days.

(21) Appl. No.: 11/195,732

(22) Filed: Aug. 3, 2005

(65) Prior Publication Data

US 2006/0075842 A1    Apr. 13, 2006

(30) Foreign Application Priority Data

Sep. 30, 2004  (JP)  ............................. 2004-288429
Sep. 30, 2004  (JP)  ............................. 2004-288430

(51) Int. Cl.
*F16H 61/34*   (2006.01)
(52) U.S. Cl. ................................... 74/473.15; 74/473.1
(58) Field of Classification Search .............. 74/473.15, 74/502.6, 505.5, 473.1, 473.3, 473.36, 473.14
See application file for complete search history.

(56) References Cited

U.S. PATENT DOCUMENTS 5,704,251 A  *  1/1998  Alber et al.  ..............  74/473.25
5,791,194 A     8/1998  Alber et al.
2004/0031345 A1*  2/2004  Choi  ........................  74/473.15

FOREIGN PATENT DOCUMENTS

| EP | 1 091 149 A2 | 4/2001 |
| FR | 2833540 | 6/2003 |
| JP | 03260412 | 11/1991 |

* cited by examiner

Primary Examiner—Richard W L Ridley
Assistant Examiner—Alan B Waits
(74) Attorney, Agent, or Firm—Studebaker & Brackett PC; Donald R. Studebaker

(57) ABSTRACT

A transmission equipped with a cable-type shift device comprises a control shaft to control a shift change with rotation and axial-direction movement thereof, an outer lever to be rotated by a shift-direction operation of a change lever, and a counterweight to rotate with the rotation of the control shaft, but not to move with the axial-direction movement of the control shaft. The counterweight includes first and second weight portions, an arm portion to interconnect these weight portions, and a support axis disposed so as to extend vertically. The support axis rotatably supports a substantial gravity center of the first and second weight portions and the arm portion. Accordingly, the counterweight can be supported smoothly and the shift feeling can be improved properly with a relatively small force for the select-direction operation of the change lever.

5 Claims, 7 Drawing Sheets

TRANSMISSION EQUIPPED WITH CABLE-TYPE SHIFT DEVICE

BACKGROUND OF THE INVENTION

The present invention relates to a transmission equipped with a cable-type shift device.

Conventionally, the transmission equipped with the cable-type shift device is known (see, for example, U.S. Pat. No. 5,791,194). In this kind of shift device, a counterweight is constituted so as to rotate with operation of a change lever, and an inertia of the counterweight improves shift feeling.

However, in the conventional shift device, the counterweight is provided at one tip end of a support arm which is supported at a rotational axis. Accordingly, a relatively large moment caused by the counterweight acts on the rotational axis, so that a smooth support would be deteriorated with the frequent rotation.

Also, since the counterweight is constituted so as to move vertically with select-direction operation of the change lever in the conventional device, the select-direction operation of the change lever would require a relatively large force, and thereby the shift feeling would not be appropriate.

Meanwhile, in order to obtain effectively a sufficient inertia of the counterweight, it is necessary to provide a space for the counterweight which can rotate without interference with any other vehicle components. However, various components are generally disposed in an engine room, and therefore the layout of the counterweight needs to be designed properly.

SUMMARY OF THE INVENTION

The present invention has been devised in view of the above-described problems. An object of the present invention is to provide the transmission equipped with a cable-type shift device which can support the counterweight smoothly and improve the shift feeling properly with a relatively small force for the select-direction operation of the change lever. Another object of the present invention is to provide the transmission equipped with a cable-type shift device which can utilize the space properly.

According to the present invention, there is provided a transmission equipped with a cable-type shift device, comprising a control shaft operative to control a shift change with rotation and axial-direction movement thereof in a case of the transmission, an outer lever operative to be rotated by a shift-direction operation of a change lever, the outer lever being fixed to the control shaft outside the case of the transmission and coupled to the change lever via a cable, and a counterweight operative to rotate with the rotation of the control shaft, but not to move with the axial-direction movement of the control shaft, wherein the counterweight includes a first weight portion and a second weight portion, an arm portion to interconnect the first and second weight portions, and a support axis disposed so as to extend vertically apart from the control shaft, and the support axis rotatably supports a substantial gravity center of an entire of the first and second weight portions and the arm portion. Accordingly, the shift feeling can be improved, and the counterweight can be supported smoothly because the middle portion of the arm portion interconnecting two weight are supported. Also, since the counterweight is constituted so as not to move in the axial direction of the control shaft, the select-direction operation of the change lever can be done with the relatively small force.

According to a preferred embodiment of the present invention, the first weight portion is heavier than the second weight portion, a first portion of the arm portion which interconnects the support axis and the first weight portion is shorter than a second portion of the arm portion which interconnects the axis support and the second weight portion, and there is further provided a link member which interconnects the second arm of the arm portion and the outer lever and thereby makes the counterweight rotate with the rotation of the outer lever. Accordingly, both efficient space utilization and weight reduction of the counterweight can be attained.

According to another preferred embodiment of the present invention, the outer lever includes a pole shaft projecting vertically, and the link member includes a circular hole through which the pole shaft is inserted. Accordingly, the outer lever can be engaged surely with the link member regardless of the vertical movement of the outer lever, and the counterweight can be made rotate with the movement of the outer lever in a simple structure.

According to another preferred embodiment of the present invention, the outer lever and the arm portion are disposed in substantially parallel. Accordingly, the linkage efficiency can be improved. Namely, the operational forces conveyed via the cable can be efficiently transmitted to the outer lever and the arm portion.

According to another preferred embodiment of the present invention, the transmission is disposed in an engine room of a vehicle and is coupled to an laterally-disposed engine via a clutch, and the counterweight is constituted such that the second weight portion rotates in a space which is enclosed by an outer peripheral portion of a housing of the clutch and an outer peripheral portion of the case of the transmission. Accordingly, the second portion of the arm portion can be constituted so as to be long enough by utilizing the space enclosed by the outer peripheral portion of the clutch housing and the outer peripheral portion of the transmission case, so that the weight of the second weight portion can be made as light as possible. Thereby, the proper clearance between the counterweight and vehicle constituting members can be ensured, and the weight reduction of the counterweight itself can be attained.

According to another preferred embodiment of the present invention, the outer lever and the arm portion are disposed in substantially parallel, and the cable is coupled to the outer lever at a substantially right angle to the outer lever and the arm portion. Accordingly, the cable can be disposed so as to be as straight as possible, and thereby the cable layout with a smooth operational force can be attained.

Other features, aspects, and advantages of the present invention will become apparent from the following description which refers to the accompanying drawings.

DETAILED DESCRIPTION OF THE INVENTION

Hereinafter, an exemplified preferred embodiment of the present invention will be described in detail referring to the accompanied drawings. Herein, the following discloses just the exemplified embodiment, and the present invention should not be to be limited to this embodiment.

Figure 1:
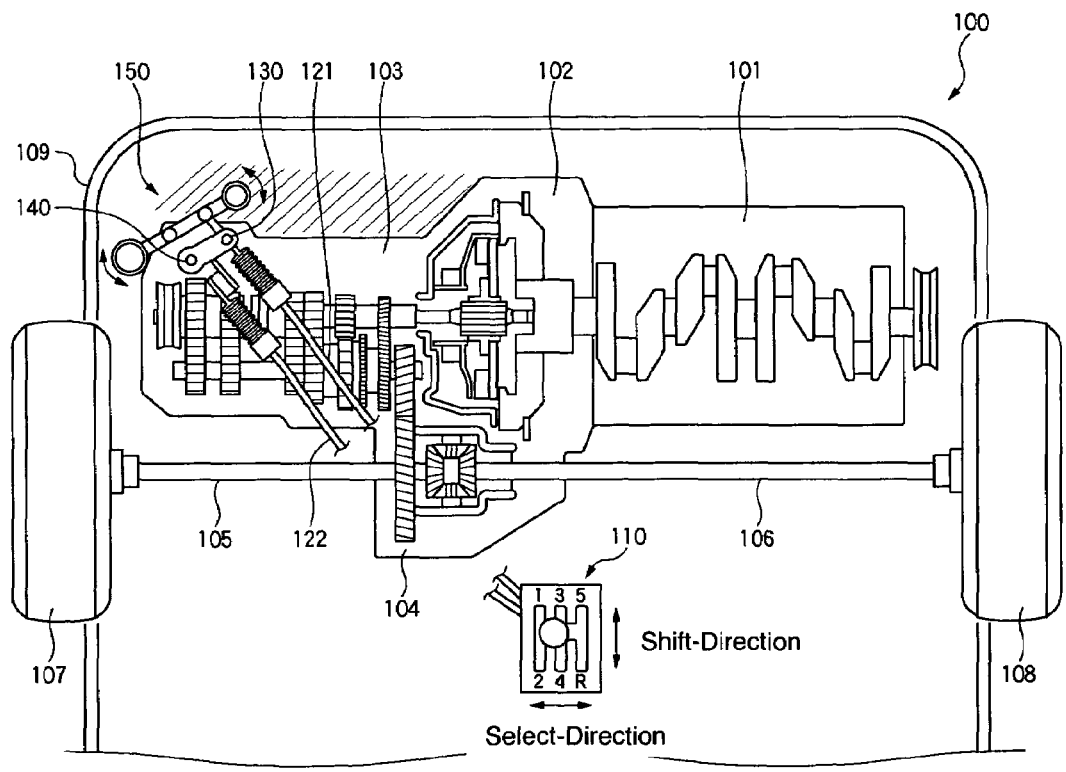
FIG. 1 is a schematic view of a vehicle equipped with a transmission according to an embodiment of the present invention, viewed from above.

FIG. 1 is a schematic view of an engine room, viewed from above, of a vehicle 100 equipped with a transmission according to an embodiment of the present invention. In the present embodiment, the transmission in which an laterally-disposed engine and a FF vehicle with a five-stage manual transmission are applied will be described as an example.

As illustrated in this figure, there is provided an engine 101 in an engine room of the vehicle 100, and a transmission 103 is coupled to the engine 101 via a clutch 102. A rotation of an output shaft of the transmission 103 is transmitted to a differential gear 104 and then to drive wheels 107, 108 via drive shafts 105, 106. The transmission 103 is disposed near a frame 109, as a vehicle component, as illustrated in the figure.

Also, in a passenger compartment of the vehicle 100 is provided a change lever 110, operation of which is transmitted to a cable-type shift device, which is part of the transmission 103, via a first cable 121 and a second cable 122.

Specifically, the shift-direction operation of the change lever 110 is transmitted to a control shaft 140 via the first cable 121 and an outer lever 130 provided at a transmission case. The outer lever 130 is rotated clockwise around an axis center of the control shaft 140 when the change lever 110 is shifted to positions of $2^{nd}$ speed, $4^{th}$ speed or R (reverse), while it is rotated counterclockwise when the change lever 110 is shifted to positions of $1^{st}$ speed, $3^{rd}$ speed or $5^{th}$ speed. Since the outer lever 130 is fixed to an upper end of the control shaft 140, the control shaft 140 is rotated as the outer lever 130 rotates. Thus, in the transmission case the shift-direction gear shift is performed with the rotation of the control shaft 140.

Meanwhile, the select-direction operation of the change lever 110 is transmitted to the upper end of the control shaft 140 via the second cable 122. Thereby, when the change lever 110 is shifted to the position available to $1^{st}$ speed or $2^{nd}$ speed, the control shaft 140 is moved downward. And, when the change lever 110 is shifted to the position available to $5^{th}$ speed or R, the control shaft 140 is moved upward. Thus, the select-direction gear shift is performed with the vertical (axial-direction) movement of the control shaft 140 in the transmission case.

There is further provided in the case of the transmission 103 a counterweight 150 which is disposed so as to rotate in a space (a portion illustrated by slash lines) which is enclosed by an outer peripheral portion of a housing of the clutch 102, an outer peripheral portion of a case of the transmission 103, and the frame 109. The counterweight 150 rotates with the rotation of the outer lever 130.

Figure 2A:
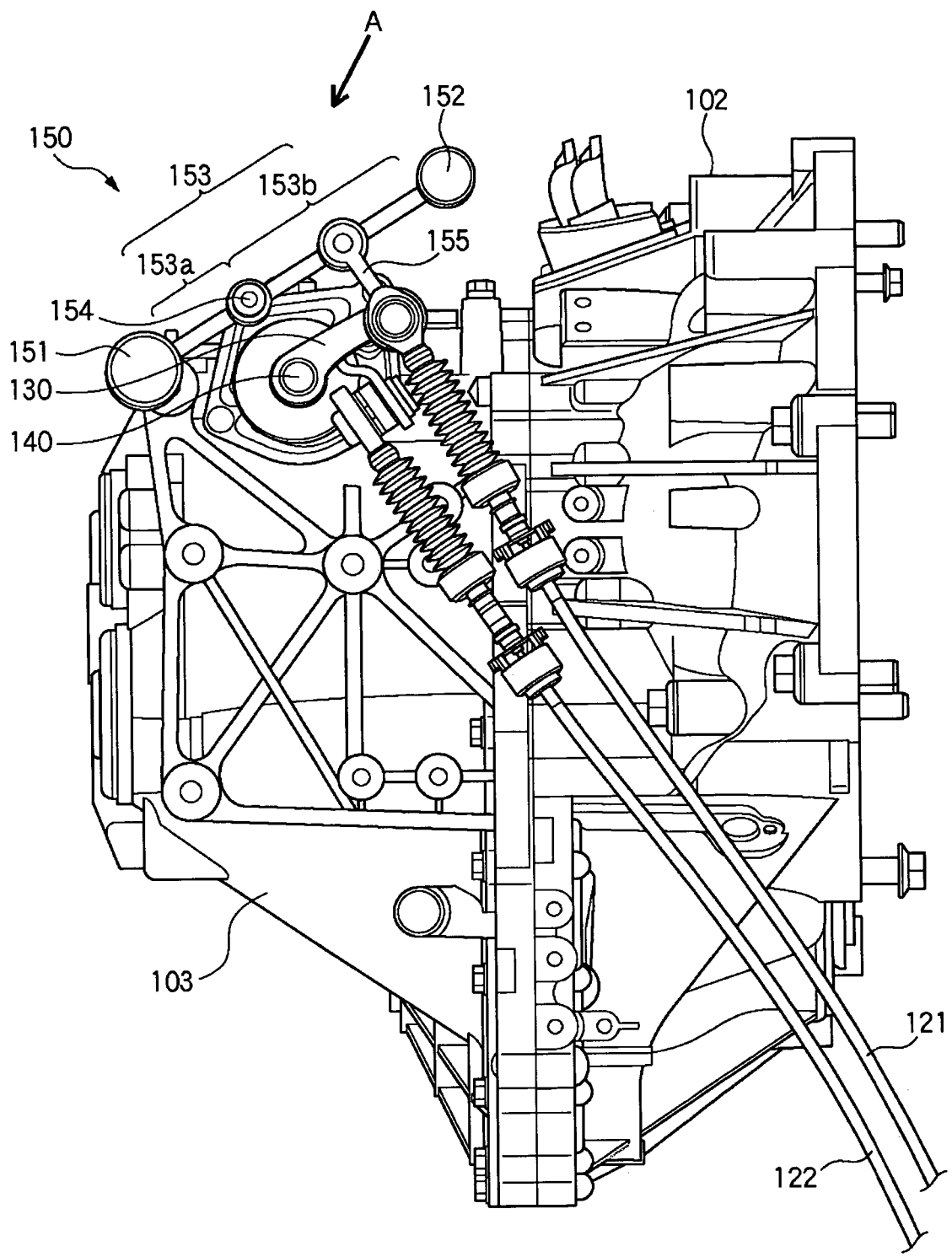
FIG. 2A is a view of the transmission and a clutch, viewed from above.
Figure 2B:
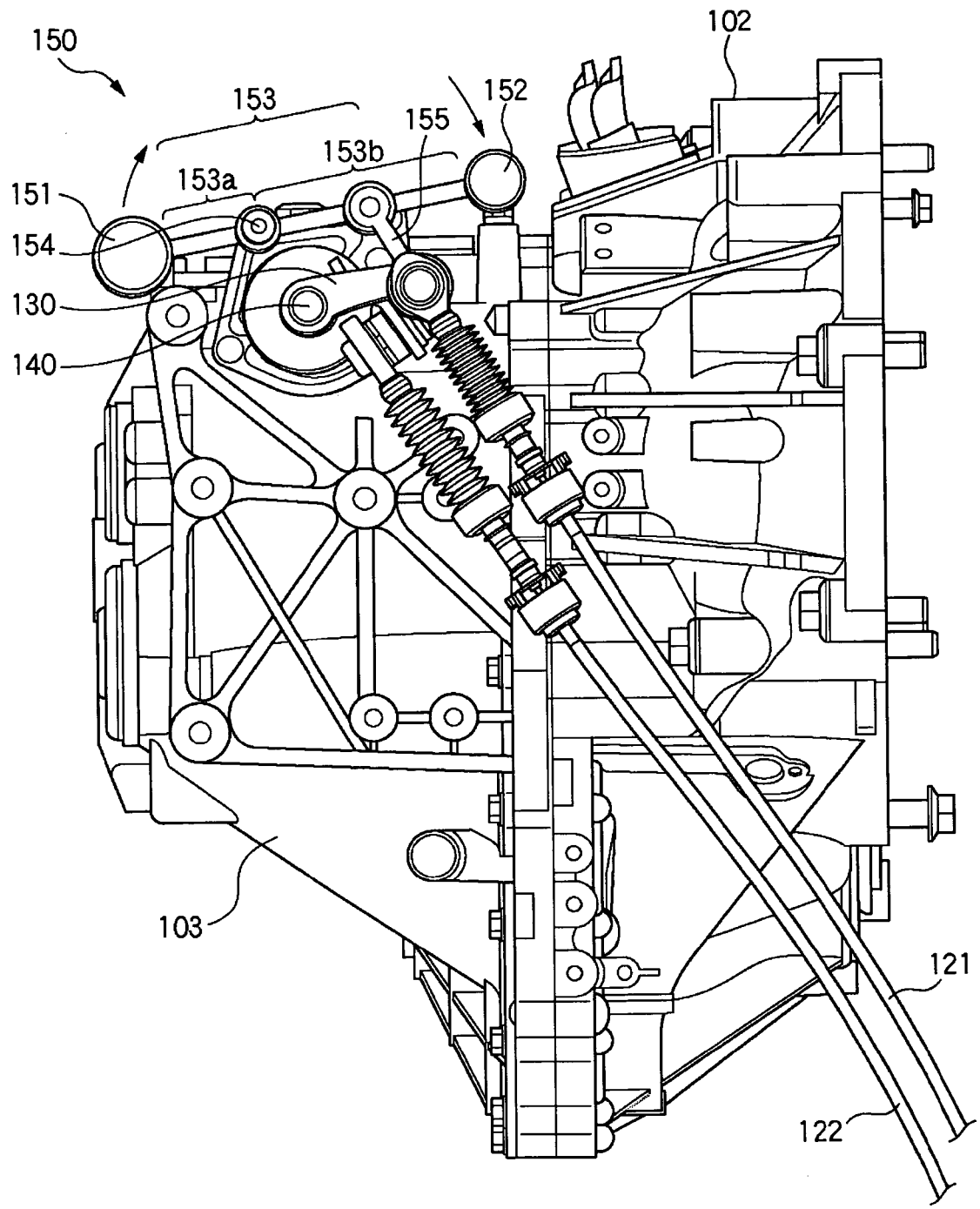
FIG. 2B is a view of the transmission and the clutch, viewed from above.
Figure 2C:
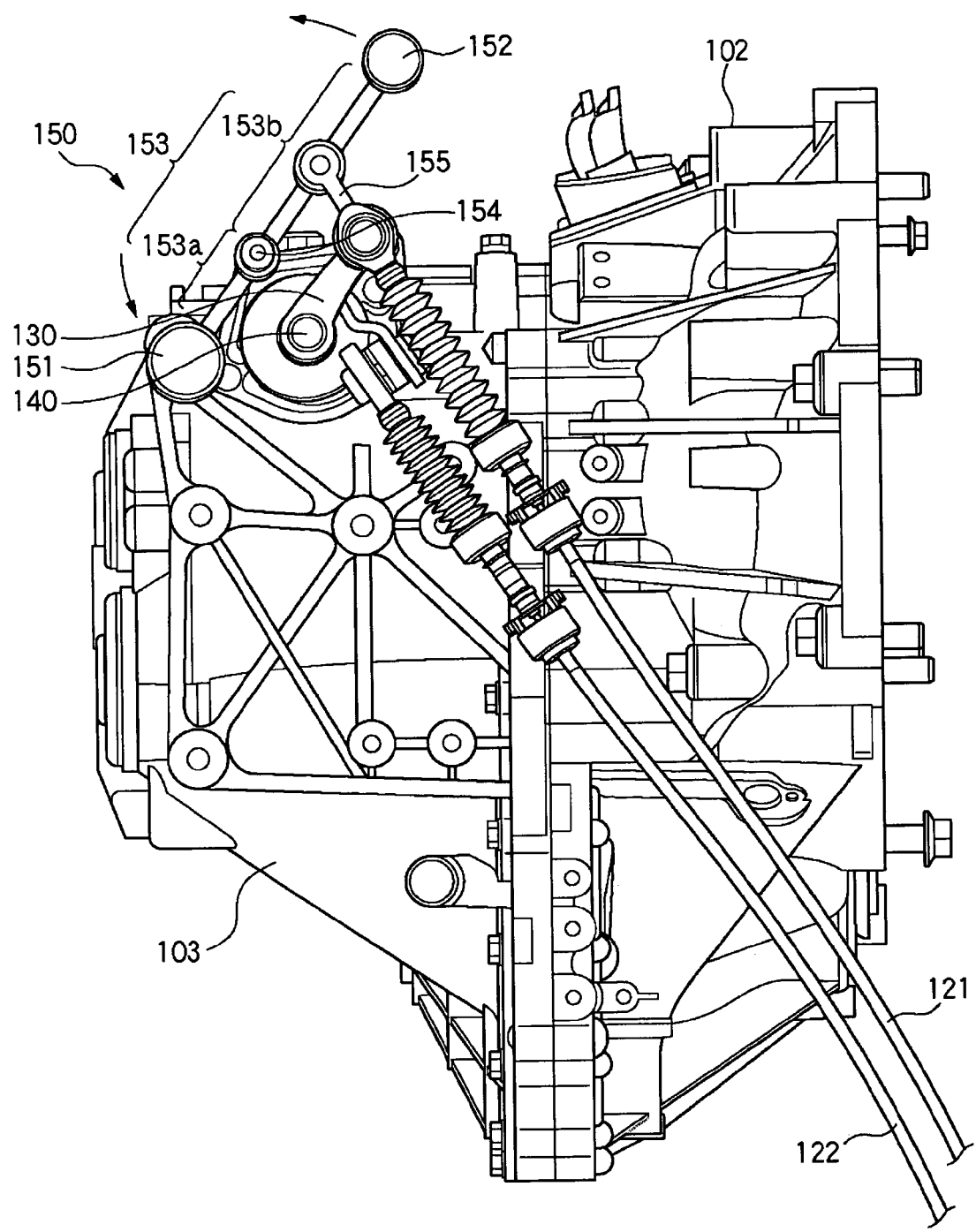
FIG. 2C is a view of the transmission and the clutch, viewed from above.
Figure 3:
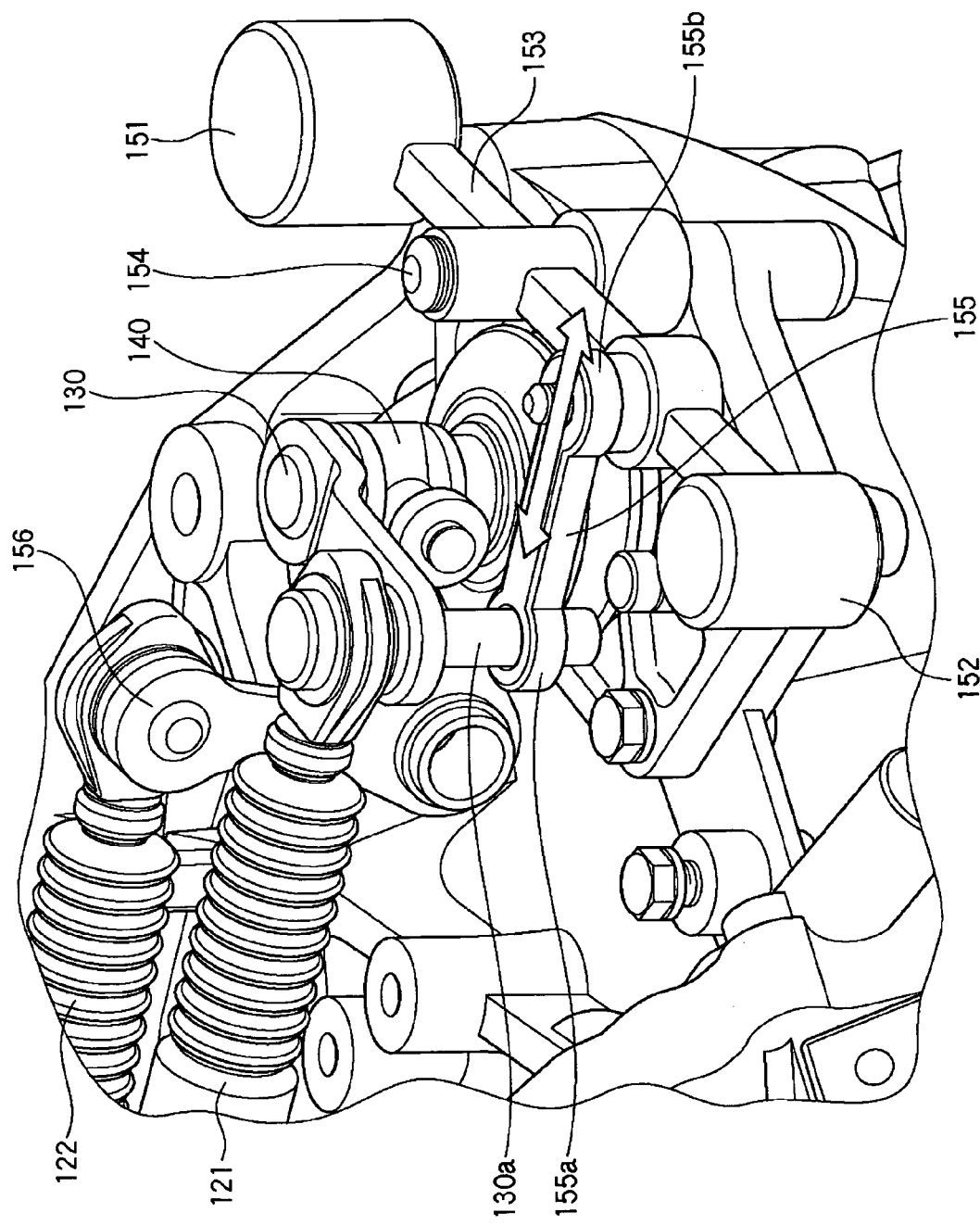
FIG. 3 is a perspective view of a counterweight, viewed from obliquely above.
Figure 4:
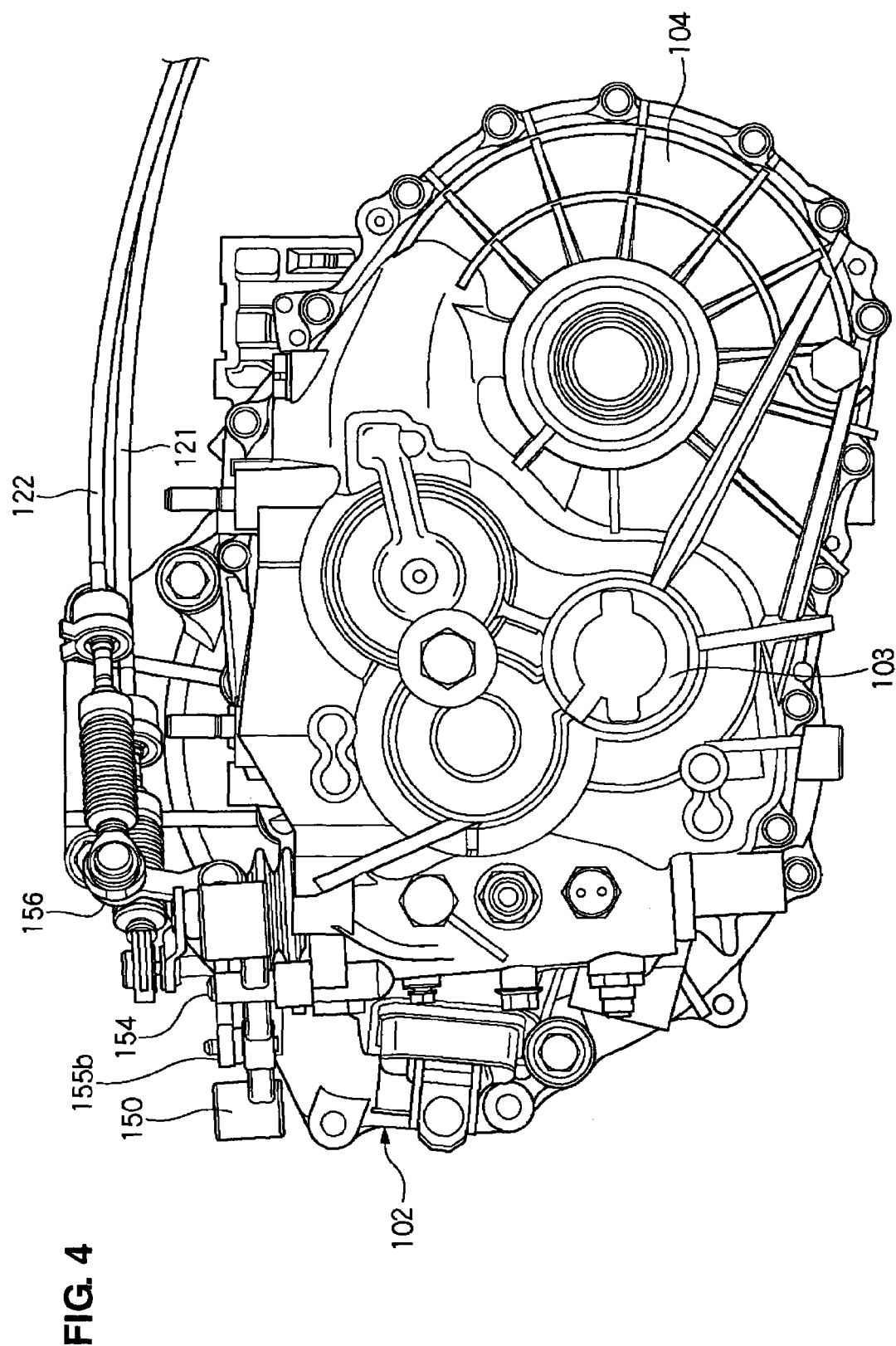
FIG. 4 is a side view of the transmission and the clutch.
Figure 5:
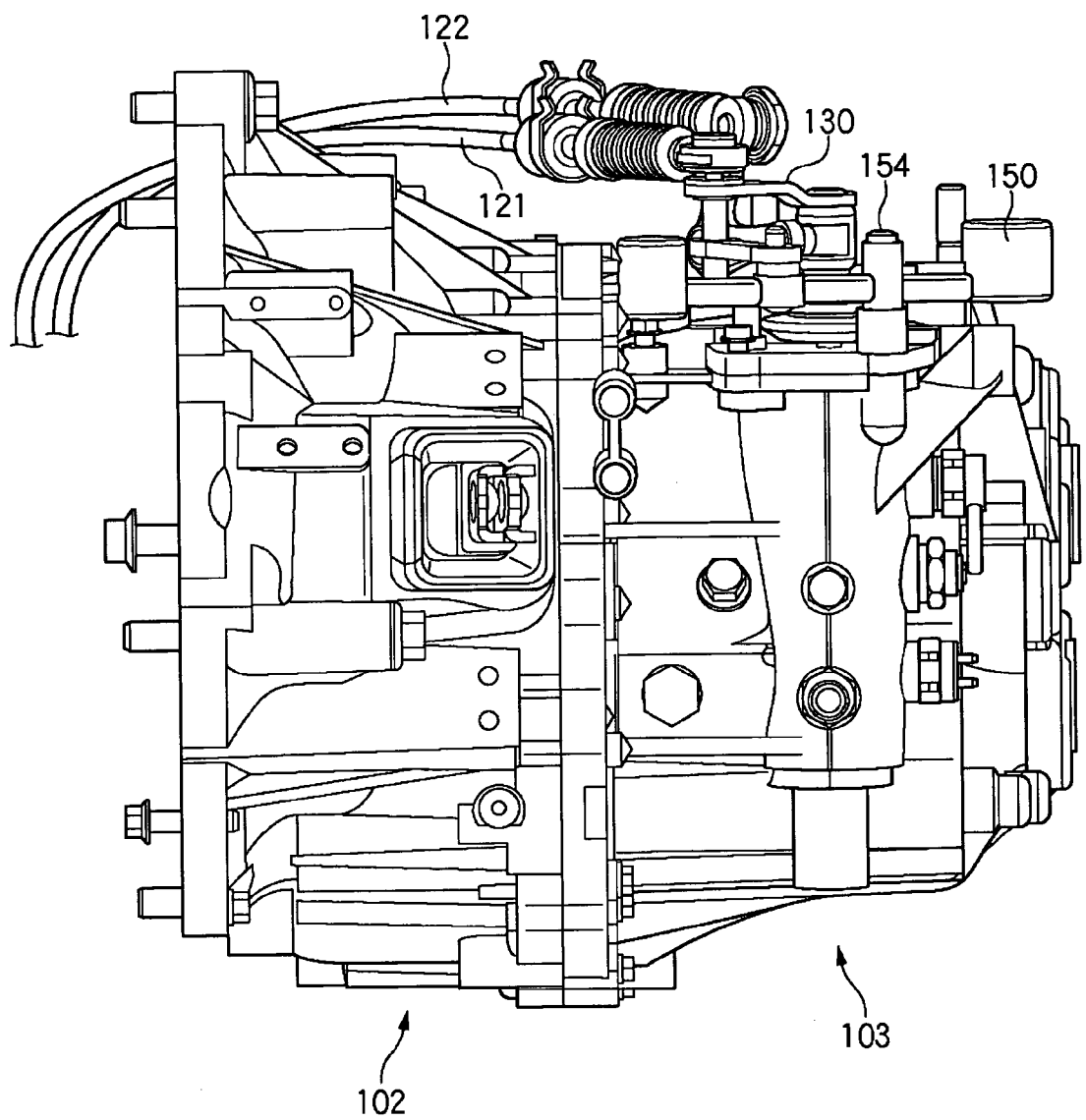
FIG. 5 is an elevation view of the transmission and the clutch.

Next, the detailed structure of the counterweight 150 will be described referring to FIGS. 2A, 2B, 2C through 4. FIGS. 2A, 2B and 2C are views illustrating only the transmission 103 and the clutch 102 of FIG. 1, viewed from above. FIG. 2A illustrates the neutral shift state, FIG. 2B illustrates the shift state of $1^{st}$ speed, $3^{rd}$ speed or $5^{th}$ speed, and FIG. 2C illustrates the shift state of $2^{nd}$ speed, $4^{th}$ speed or R. FIG. 3 is a perspective view of the counterweight 150, viewed from above and an A direction in FIG. 2A. FIG. 4 is a side view of the transmission 103 and the clutch 102, viewed from left in FIG. 2A. FIG. 5 is an elevation view of the transmission 103 and the clutch 102, viewed from the front of the vehicle, i.e., from above in FIG. 2A.

The counterweight 150 comprises a first weight portion 151, a second weight portion 152 which is lighter than the first weight portion 151, an arm portion 153 to interconnect the first and second weight portions 151 and 152, and a support axis 154 to support the arm portion 153. The support axis 154 is disposed so as to extend vertically, apart from the control shaft 140. The support axis 154 is disposed on an upper face of the case of the transmission 103 at a portion which is the furthest away from the engine as illustrated in FIG. 2A and from the differential gear 104 as illustrated in FIG. 4.

Also, the arm portion 153 comprises a first portion 153a which interconnects the support axis 154 and the first weight portion 151 and a second portion 153b which is longer than the first portion 153a and interconnects the axis support 154 and the second weight portion 152. The reason for making the first portion 153a shorter than the second portion 153b is to avoid interference with peripheral members located around the transmission 103, such as the vehicle frame, thereby solving limitations in layout.

The counterweight 150 is constituted such that the second weight portion 152 rotates in the space which is enclosed by the outer peripheral portion of the clutch 102 and the outer peripheral portion of the case of the transmission 103. Accordingly, since a disposition of the second portion 153b has little limitation in its layout, the second portion 153b can be made longer than the first portion 153a. As a result, the second weight portion 152 can be made as light as possible, thereby reducing the total weight of the counterweight 150 properly.

The outer lever 130 and the arm portion 153 are substantially parallel, and the cable 121 is coupled to the outer lever 130 at a substantially right angle to them. Also, the support axis 154 rotatably supports the substantial gravity center of the entire of the first weight portion 151, the second weight portion 152 and the arm portion 153. Thereby, the counterweight 150 can be smoothly supported at the support axis 154. Further, there is provided a link member 155 which interconnects the second arm 153b of the arm portion 153 and the outer lever 130 and thereby makes the entire of the first weight portion 151, the second weight portion 152 and the arm portion 153 rotate around the support axis 154 as the outer lever 130 is rotated.

As apparent from FIG. 3, the outer lever 130 includes a pole shaft 130a projecting vertically, and the link member 155 includes a circular hole 155a through which the pole shaft 130a is inserted. The circular hole 155a is formed at one end of the link member 155, and at the other end of the link member 155 is provided a connecting portion 155b which is coupled to the substantially center portion of the second portion 153b of the arm portion 153.

The cable 122 is coupled to a L-shaped member 156, which is rotatable around a corner portion thereof. One end of the L-shaped member 156 is coupled to the cable 122, while the other end of the L-shaped member 156 is connected to the control shaft 140. Thereby, the L-shaped member 156 rotates as the cable 122 is operated, and the control shaft 140 moves vertically (in the axial direction) as the L-shaped member 156 rotates.

Herein, when the control shaft 140 moves vertically with the select-direction operation of the change lever, the height of the outer lever 130 changes. Accordingly, the distance in the vertical direction between the link member 155 and the outer lever 130 changes. However, the connection between the outer lever 130 and the link member 155 is constituted by the pole shaft 130a and the circular hole 155a. The pole shaft 130a provided at the outer lever 130 is inserted through the circular hole 155a formed at the link member 155. Thus, the vertical movement of the outer lever 130 does not matter. Namely, the counterweight 150 rotates only with the rotation of the control shaft 140, not with the vertical movement of the control shaft 140. Accordingly, the select-direction operation of the change lever 110 can be done with a relatively light force.

Herein, the pole shaft 130a needs to have its length which is longer than the vertical movement width of the control shaft 140. Although the pole shaft is provided at the outer lever 130 and the circular hole is formed at the link member 155 in the present embodiment, conversely the circular hole may be formed at the side of the outer lever 130 and the pole shaft may be provided at a tip of the link member 155.

As described above, according to the present embodiment, since the two weight portions 151, 152 are coupled by the arm portion 153 and the arm portion 153 is rotatably supported, the shift feeling can be improved and the counterweight 150 can be smoothly supported. Further, making use of the space enclosed by the outer peripheral portion of the clutch 102 and the outer peripheral portion of the transmission 103, the relatively-light second weight portion 152 coupled by the relatively-long second portion 153b of the arm portion 153 is constituted so as to rotate in this space. Namely, a proper clearance between the counterweight and the vehicle constituting members can be ensured, and the weight reduction of the counterweight itself can be attained.

Herein, although the laterally-disposed engine is applied and the FF vehicle with the five-stage manual transmission is described in the present embodiment, the present invention should not be limited to this embodiment. The present invention can be also applied to a longitudinally-disposed engine, a six-stage manual transmission, and a RR vehicle. Any other modifications and improvements can be applied within the scope of a spirit of the present invention.

What is claimed is:

1. A transmission equipped with a cable-type shift device, comprising:
   a change lever;
   a first cable operative to transmit a shift-direction operation of the change lever and a second cable operative to transmit a select-direction operation of the change lever;
   a control shaft operative to control a shift change with rotation and axial-direction movement thereof in a case of the transmission, the rotation of the control shaft performing a shift-direction gear shift in the case of the transmission, the axial-direction movement of the control shaft performing a select-direction gear shift in the case of the transmission;
   an outer lever operative to be rotated by the shift-direction operation of the change lever via the first cable, the outer lever being fixed to said control shaft outside the case of the transmission so as to cause said rotation of the control shaft according to the shift-direction operation of the change lever, the outer lever including a pole shaft which projects substantially in a direction of the axial-direction movement of the control shaft and has a specified projecting length which corresponds to a moving distance of said axial-direction movement of the control shaft performing the select-direction gear shift;
   a member operative to be moved by the select-direction operation of the change lever via the second cable, the member being coupled to said control shaft so as to cause said axial-direction movement of the control shaft according to the select-direction operation of the change lever;
   a counterweight operative to rotate with the rotation of said control shaft via a link member, the counterweight including a first weight portion and a second weight portion, an arm portion to interconnect the first and second weight portions, and a support axis disposed so as to extend vertically apart from said control shaft, the support axis rotatably supporting a substantial gravity center of an entire of the first and second weight portions and the arm portion, the link member including a circular hole to allow said pole shaft of the outer lever to move therein,
   wherein said link member connects said outer lever to said arm portion of the counterweight in such a manner that said pole shaft of the outer lever is inserted through said circular hole of the link member so that the pole shaft of the outer lever moves freely through the circular hole of the link member in the direction of the axial-direction movement of the control shaft according to the axial-direction movement of the control shaft which is caused by the select-direction operation of the change lever, without pushing down or pulling up the arm portion of the counterweight, and that the rotation of the outer lever can be transmitted to the counterweight for the rotation of the counterweight according to the shift-direction operation of the change lever.

2. A transmission equipped with a cable-type shift device which is disposed in an engine room of a vehicle and is coupled to an laterally-disposed engine via a clutch, comprising:
   a change lever;
   a first cable operative to transmit a shift-direction operation of the change lever and a second cable operative to transmit a select-direction operation of the change lever;
   a control shaft operative to control a shift change with rotation and axial-direction movement thereof in a case of the transmission, the rotation of the control shaft performing a shift-direction gear shift in the case of the transmission, the axial-direction movement of the control shaft performing a select-direction gear shift in the case of the transmission;
   an outer lever operative to be rotated by the shift-direction operation of the change lever via the first cable, the outer lever being fixed to said control shaft outside the case of the transmission so as to cause said rotation of the control shaft according to the shift-direction operation of the change lever;
   a member operative to be moved by the select-direction operation of the change lever via the second cable, the member being coupled to said control shaft so as to cause said axial-direction movement of the control shaft according to the select-direction operation of the change lever;
   a counterweight operative to rotate with the rotation of said control shaft via a link member, the counterweight including a first weight portion and a second weight portion, an arm portion to interconnect the first and second weight portions, and a support axis disposed so as to extend vertically apart from said control shaft, the support axis rotatably supporting a substantial gravity center of an entire of the first and second weight portions and the arm portion,
   wherein said link member connects said outer lever to said arm portion of the counterweight so as to transmit the rotation of the outer lever to the counterweight for the rotation of the counterweight according to the shift-direction operation of the change lever, but not transmit an axial-direction movement of the outer lever which is caused by the axial-direction movement of the control shaft according to the select-direction operation of the change lever to the counterweight, said counterweight is disposed on an upper face of the case of the transmission and the support axis of the counterweight is located forward relative to said control shaft, and said first weight portion of the counterweight is heavier than said second weight portion of the counterweight and said second weight portion is positioned closer to the clutch than the first weight portion in a vehicle width direction, a first portion of said arm portion which interconnects said support axis and said first weight portion is shorter than a second portion of said arm portion which interconnects said axis support and the second weight portion, whereby the support axis can rotatably support the substantial gravity center of the entire of the first and second weight portions and the arm portion, and said link member connects the outer lever to said second portion of the arm portion of the counterweight.

3. The transmission equipped with a cable-type shift device of claim 1, wherein said outer lever and said arm portion are disposed in substantially parallel.

4. The transmission equipped with the cable-type shift device of claim 1, wherein the transmission is disposed in an engine room of a vehicle and is coupled to an laterally-disposed engine via a clutch, and said counterweight is constituted such that said second weight portion rotates in a space which is enclosed by an outer peripheral portion of a housing of the clutch and an outer peripheral portion of the case of the transmission.

5. The transmission equipped with a cable-type shift device of claim 4, wherein said outer lever and said arm portion are disposed in substantially parallel, and said first cable is coupled to said outer lever at a substantially right angle to the outer lever and the arm portion.

* * * * *